March 9, 1943.    P. E. M. J. MOLS    2,313,493
PROCESS OF AND MEANS FOR GRINDING GLASS PLATES
Filed Feb. 12, 1940

Paul Edmond Marie Joseph Mols
by: Haseltine Lake & Co.
ATTORNEYS

Patented Mar. 9, 1943

2,313,493

UNITED STATES PATENT OFFICE 2,313,493

PROCESS OF AND MEANS FOR GRINDING GLASS PLATES

Paul Edmond Marie Joseph Mols, Boitsfort, Belgium; vested in the Alien Property Custodian Application February 12, 1940, Serial No. 318,403
In France March 2, 1939

6 Claims. (Cl. 51—110)

It is known that in order to obtain polished plate glass, glass sheets or plates are successively subjected to grinding, that is to the planing of their sides by rubbing with hard tools, and to polishing by means of tools covered with felt or other soft material.

For grinding, the glass plate is secured on a plane surface, as a table, used as a support, with the interposition if desired of a bed of plaster for example, or of paper, fabric or other material. The upper side of the plate then is ground by a tool or grinder, usually made of hard metal, cast iron or carborundum, which rubs the glass with the interposition of an abrasive material such as sand. Grinding proceeds with tools supplied with abrasives which are of gradually finer grain, this being the second or finishing stage of the grinding process, in order to prepare the glass surface for the polishing process. After polishing, the plate is turned over on the support in order to be subjected to the same operations on its opposite side.

As the rough plates of glass have inequalities in their thickness and their evenness, their under sides do not rest on the supporting tables with the whole of their surface, with the result that owing to the elasticity of the glass, the plate bends under the pressure of the grinding tools, the protruding portions of the surface being worked upon are pressed down, and this will occur more easily as the points of contact between the table and the plate are spaced farther apart. These portions stay depressed so long as the pressure of the grinding tool is kept up. When this pressure is released they rise again by reason of the elasticity of the glass and they form defects in the evenness of the glass surface which cannot be removed by the subsequent polishing operation. These defects which are very prejudicial to the appearance of the polished glass, also occur when the plate has been laid on a plaster bed.

The present invention aims at eliminating or at least considerably reducing this inconvenience.

According to this invention the glass plate is no longer secured on a support having a plane surface, but it is supported during the grinding operation on multiple elements such as rollers or rows of balls which afford a large number of uniformly spaced points or lines of contact, and a relative movement is kept up between said supporting points and the plate during the grinding operation. During this movement, the concave portions and the convex portions of the under side of the rough plate of glass are bound to come into contact, successively, with the supporting points: It follows that in the course of its travelling motion, each portion of the plate comprised between successive supporting points goes through a slight vertical movement, the effect of which is to increase the pressure of the grinding tools at the protruding spots, and the wear of such spots thus is accelerated to a surprising extent. This action may be explained by the fact that the possibility of the plate being depressed by the grinding tools is limited by the reduced distance between its supporting points and is no longer dependent on the magnitude of the defects or inequalities, as is the case when the sheet is ground on supports with a plane surface.

The process according to this invention distinguishes over the use of rollers as have already been proposed for supporting the glass during the polishing operation, as the polishing tools have no action on any inequalities in the surface of the glass and anyhow, when they are subjected to polishing, the sheets have already been ground and they no longer possess inequalities capable of raising them on their supports; furthermore, even if a vertical movement should take place, the polishing tools would yield instead of firmly opposing such movement as do the grinders, and a wearing effect would not be obtained.

In carrying out the invention various means may be used, as will be described with reference to the accompanying drawing in which:

Figs. 2, 3 and 4 show in front elevation, by way of example, various forms of rollers.

Fig. 5 shows in side elevation a support with free rollers or cylinders.

Fig. 6 is a plan view showing a support with balls.

Figs. 7, 8 and 9 show roller devices having their own movements relatively to the glass sheet.

Figure 1:
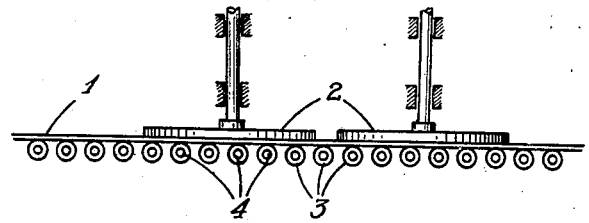
Fig. 1 illustrates diagrammatically in side elevation a method of supporting the glass to be ground on rollers.
Figure 1:
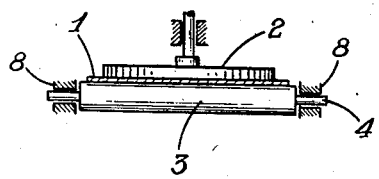
Figure 1:
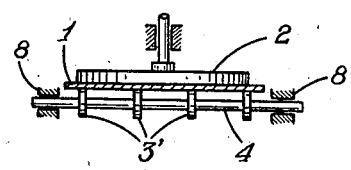
Figure 1:
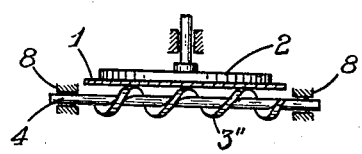
Figure 1:
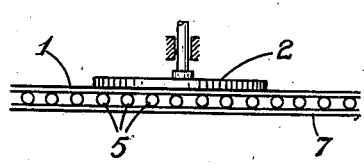
Figure 1:
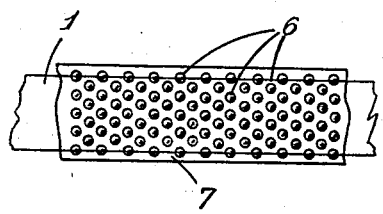
Figure 1:
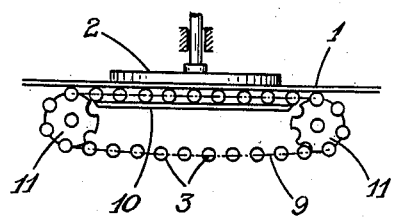
Figure 1:
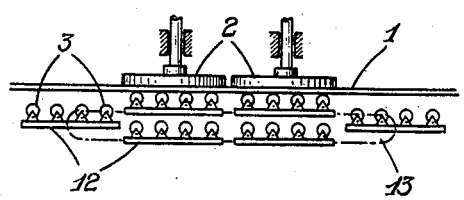
Figure 1:
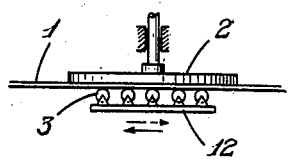

In Figs. 1 and 2, the rough glass sheet 1 to be ground travels under rotary grinders 2 while it is supported on rollers 3 adapted to revolve on their axes 4 mounted in bearings 8. The rollers 3 may have a smooth surface as shown in Fig. 2, or they may be grooved so as to form a plurality of parallel discs 3' (Fig. 3), or their supporting surface may be of helical shape as at 3" (Fig. 4) or of any other suitable shape.

The axes 4 of the rollers may either be parallel or at an angle to each other; their direction may be perpendicular or oblique to the direction of movement of the glass sheet.

Instead of rollers mounted on their axes, I may use free rollers 5 supported on a flat surface 7 (Fig. 5) or balls 6 freely supported on a surface 7 (Fig. 6).

In the examples above described, it has been supposed that the sheet or plate to be ground is in the form of a continuous band, but it will be understood that the supporting means illustrated are also suitable for supporting a succession of separate plates.

It will also be seen that while the supporting means as illustrated in Figs. 1 to 6 are suitable for supporting a glass plate or glass plates travelling under grinding tools, the speed of movement of the plate relatively to the supporting points being dependent solely upon the speed of travel of the plate.

It may however be desirable to obtain between the plate and its supporting points an optimum relative speed in order to secure the highest grinding efficiency, without varying the speed of travel of the plate. To this end, we mount the supporting means so that they have movements of their own, which are independent of the movements of the plate.

Fig. 7 shows an arrangement of this kind in which the rollers 3 are interconnected by an endless band or chain 9 and run on tracks 10 and rotating drums 11. The drums may be so actuated that the rollers 3 travel in the same direction as, or in opposite direction to, the glass sheet.

In Fig. 8 a number of sets of rollers 3 are carried each by a table 12, and said tables are interconnected by an endless member diagrammatically shown at 13 so that they have a continuous movement. In Fig. 9 a table 12 is shown to which a reciprocating movement is imparted.

The movements of the chains 9 and of the tables 12 may be varied or adjusted independently of the speed of travel of the glass sheet so as to give the best working conditions.

The operative surfaces of the grinders may be working in a fixed plane and in that case the glass plate is pressed against said surfaces by its support, or conversely the points of contact between the glass plate and its supports may be situated in a fixed plane, the grinders then exerting a pressure on the glass. Thus, in Fig. 7 for instance, the grinder o may be vertically adjustable in its bearings, while the rollers 3 may be raised or lowered as desired by vertically adjusting the position of the rails 10.

In the various forms of the invention, the grinding process has the advantage of presenting to the grinding tools rough sheets of glass which are supported on points that are continuously moved with respect to inequalities in the surface of glass so that any spots where the thickness is excessive are periodically lifted and they cannot escape the action of the grinders.

I claim:

1. In apparatus for grinding rough glass plates, the combination of means for supporting the rough plate of glass at a plurality of points spaced apart from each other, a grinding disc rotatable on its axis extending at right angles to said plate and adapted to work on the exposed side of said plate opposite said supporting points, means for moving said plate with respect to said grinding disc, and means for imparting to said supporting means a linear movement with respect to said grinding disc independently of the movements of said plate.

2. In apparatus for grinding rough glass plates, the combination of means for supporting the rough plate of glass at a plurality of points spaced apart from each other, a grinding disc rotatable on its axis extending at right angles to said plate and adapted to work on the exposed side of said plate opposite said supporting points, means for moving said plate with respect to said grinding disc, and means for imparting to said supporting means a linear movement with respect to said grinding disc independently of the movements of said plate, said supporting means comprising a plurality of rotary rollers movable bodily in a direction parallel to the direction of movement of said plate.

3. In apparatus for grinding rough glass plates, the combination of means for supporting the rough plate of glass at a plurality of points spaced apart from each other, a grinding disc rotatable on its axis extending at right angles to said plate and adapted to work on the exposed side of said plate opposite said supporting points, means for moving said plate with respect to said grinding disc, and means for imparting to said supporting means a linear movement with respect to said grinding disc independently of the movements of said plate, said supporting means comprising a plurality of parallel rollers and an endless flexible driving member interconnecting said rollers.

4. In apparatus for grinding rough glass plates, the combination of means for supporting the rough plate of glass at a plurality of points spaced apart from each other, a grinding disc rotatable on its axis extending at right angles to said plate and adapted to work on the exposed side of said plate opposite said supporting points, means for moving said plate with respect to said grinding disc, and means for imparting to said supporting means a linear movement with respect to said grinding disc independently of the movements of said plate, said supporting means comprising a plurality of parallel rollers and a driving member therefor, said member being movable in a direction parallel to the direction of movement of said plate.

5. A process for grinding rough plates of glass, which consists in subjecting one side of a rough plate to grinding pressure and grinding same over a substantial portion thereof, applying to the other side of said plate a counterpressure at a plurality of points spaced apart from each other, said points facing the portion of said plate being ground, imparting to said plate a linear motion relatively to said supporting points, and imparting to said supporting points an independent linear motion.

6. A process for grinding rough plates of glass, which consists in subjecting one side of a rough plate to grinding pressure and grinding same over a substantial portion thereof, applying to the other side of said plate a counterpressure at a plurality of points spaced apart from each other, said points facing the portion of said plate being ground, imparting to said plate a linear motion relatively to said supporting points, and imparting to said supporting points an independent linear reciprocating motion.

PAUL EDMOND MARIE JOSEPH MOLS.